(12) United States Patent
Wen et al.

(10) Patent No.: US 9,420,877 B2
(45) Date of Patent: Aug. 23, 2016

(54) METHOD FOR PRODUCING A TOOTHBRUSH HAVING AN INNER CAVITY

(71) Applicant: The Proctor & Gamble Company, Cincinnati, OH (US)

(72) Inventors: Li Wen, Mason, OH (US); Matthew Lloyd Newman, Mason, OH (US); Andrew Joseph Horton, West Chester, OH (US); Stephen Alan Houghton, Victoria (AU); Scott Andrew Jackson, Cincinnati, OH (US); Bradley John Phillips, Victoria (AU); Hansjoerg Reick, Kronberg (DE); Richard Darren Satterfield, West Chester, OH (US); Andrew M. Uhe, Victoria (AU); George Michael West, Cincinnati, OH (US); Christopher Thomas Ryan, Victoria (AU); Francisco Emanuel Alves, Plainfield, IL (US); Kyle Ali Muhammad, Plainfield, IL (US)

(73) Assignee: THE PROCTER & GAMBLE COMPANY, Cincinnati, OH (US)

( * ) Notice: Subject to any disclaimer, the term of this patent is extended or adjusted under 35 U.S.C. 154(b) by 373 days.

(21) Appl. No.: 13/683,716

(22) Filed: Nov. 21, 2012

(65) Prior Publication Data

US 2014/0137353 A1    May 22, 2014

Related U.S. Application Data

(60) Provisional application No. 61/562,675, filed on Nov. 22, 2011.

(51) Int. Cl.
*B29C 49/04* (2006.01)
*A46D 3/00* (2006.01)
*B29C 49/20* (2006.01)
*B29C 47/00* (2006.01)
*B29L 21/00* (2006.01)

(52) U.S. Cl.
CPC . *A46D 3/00* (2013.01); *B29C 49/20* (2013.01); *A46B 2200/1066* (2013.01); *B29C 47/0023* (2013.01); *B29C 47/0054* (2013.01); *B29C 49/04* (2013.01); *B29C 2049/048* (2013.01); *B29C 2049/2017* (2013.01); *B29L 2021/00* (2013.01)

(58) Field of Classification Search
CPC .. B29C 45/17; B29C 49/04; B29C 2049/044; B29C 2049/047; B29C 2049/048
USPC ................. 300/21; 264/540–541
See application file for complete search history.

(56) References Cited

U.S. PATENT DOCUMENTS

| 265,181 A | 9/1882 | Sylvester |
|---|---|---|
| 3,936,261 A | 2/1976 | Jones et al. |
| 4,802,255 A | 2/1989 | Breuer et al. |
| 5,052,071 A | 10/1991 | Halm |
| 5,268,005 A | 12/1993 | Suhonen |
| 5,313,909 A | 5/1994 | Tseng et al. |

(Continued)

FOREIGN PATENT DOCUMENTS

| CN | 2756064 | 2/2006 |
|---|---|---|
| CN | 102166064 | 8/2011 |

(Continued)

*Primary Examiner* — Laura C Guidotti
(74) *Attorney, Agent, or Firm* — James E. Oehlenschlager

(57) ABSTRACT

Methods of producing a unitary personal care article such as a toothbrush having an inner cavity.

20 Claims, 19 Drawing Sheets

(56) References Cited

U.S. PATENT DOCUMENTS

| | | |
|---|---|---|
| 5,564,152 A | 10/1996 | Jeannet et al. |
| 5,722,106 A | 3/1998 | Masterman et al. |
| 5,836,769 A | 11/1998 | Spencer |
| 5,845,358 A | 12/1998 | Woloch |
| 5,884,127 A | 3/1999 | Kim et al. |
| 6,018,840 A | 2/2000 | Guay et al. |
| 6,058,541 A | 5/2000 | Masterman et al. |
| 6,066,282 A | 5/2000 | Kramer |
| 6,151,745 A | 11/2000 | Roberts et al. |
| 6,475,553 B2 | 11/2002 | Guay et al. |
| 6,553,604 B1 | 4/2003 | Braun et al. |
| 6,679,696 B1 | 1/2004 | McConnell et al. |
| 6,796,785 B2 | 9/2004 | Kawamoto et al. |
| 6,818,174 B2 | 11/2004 | Morawski |
| 7,389,781 B2 | 6/2008 | Kemp et al. |
| 8,297,710 B2 | 10/2012 | Sakurai et al. |
| 8,382,208 B2 | 2/2013 | Baertschi |
| 8,568,634 B2 | 10/2013 | Porter et al. |
| 2002/0074698 A1 | 6/2002 | Morawski |
| 2003/0183242 A1 | 10/2003 | Kemp et al. |
| 2004/0154112 A1 | 8/2004 | Braun et al. |
| 2004/0221410 A1 | 11/2004 | Padula |
| 2005/0036821 A1 | 2/2005 | Pfenniger et al. |
| 2005/0170113 A1 | 8/2005 | Hill |
| 2005/0170114 A1 | 8/2005 | Hill |
| 2005/0188487 A1 | 9/2005 | Moskovich et al. |
| 2006/0080794 A1 | 4/2006 | Punshon |
| 2006/0151539 A1 | 7/2006 | Tsubaki et al. |
| 2006/0272112 A9 | 12/2006 | Braun et al. |
| 2007/0163064 A1 | 7/2007 | Wong et al. |
| 2007/0251040 A1 | 11/2007 | Braun et al. |
| 2007/0272652 A1 | 11/2007 | Beale |
| 2009/0013488 A1 * | 1/2009 | Sakurai et al. ............... 15/167.1 |
| 2011/0041272 A1 | 2/2011 | Prencipe et al. |
| 2014/0047656 A1 | 2/2014 | Newman et al. |
| 2014/0137349 A1 | 5/2014 | Newman et al. |
| 2014/0137350 A1 | 5/2014 | Wen et al. |
| 2014/0137354 A1 | 5/2014 | Newman et al. |
| 2014/0138880 A1 | 5/2014 | Pfeifer et al. |

FOREIGN PATENT DOCUMENTS

| | | | |
|---|---|---|---|
| CN | 2160251 | 10/2015 | |
| DE | 4136537 | 1/1993 | |
| DE | 19531368 | 2/1997 | |
| DE | 10023725 | 11/2001 | |
| DE | 102005036301 | 2/2007 | |
| EP | 0668140 | 8/1995 | |
| EP | 0721832 | 4/1999 | |
| EP | 1639913 | 3/2006 | |
| JP | 10-16037 * | 1/1998 | ............. B29C 49/20 |
| JP | H1016037 | 1/1998 | |
| WO | WO2004077996 | 9/2004 | |

* cited by examiner

METHOD FOR PRODUCING A TOOTHBRUSH HAVING AN INNER CAVITY

FIELD OF THE INVENTION

The present invention relates to methods of producing personal care articles such as toothbrushes having an inner cavity.

BACKGROUND OF THE INVENTION

Toothbrushes are typically manufactured using an injection molding process. Such an injection molding process is characterized by providing a mold in the shape of the toothbrush and injecting molten plastic through a hot channel nozzle into the mold. The toothbrush is then cooled and ejected from the mold. For example, U.S. Pat. No. 5,845,358 shows such a toothbrush made by injection molding. One of the limitations of the conventional injection molding processes is that large diameter handles, and especially large handles having substantial contours along their length cannot be produced in an efficient manner.

Toothbrushes with increased handle diameters provide substantial advantages, for instance they can provide increased gripping area for children increasing the ability of children to handle and use toothbrushes; also people with disabilities such as arthritis sometimes have difficulty in handling toothbrushes due to difficulty in flexing the joints in their hands. Such difficulties are considerably relieved by means of toothbrushes having increased handle diameters. Additionally, the larger cross section handles on the toothbrushes are better for the user from an ergonomic point of view.

Even better from an ergonomic point of view are large handles having contours, characterized by one or more substantial variations in cross sectional area, including both increasing and decreasing cross sectional area, along the length or major axis of the brush. Such variation in cross-sectional area allows the user to have better grip and handling of the brush during use, when it must be rapidly moved, often while wet or slippery.

Even though there are advantages to toothbrushes having increased handle diameters, the use of injection molding to manufacture toothbrushes with larger cross section handles has at least five drawbacks.

First—the toothbrush is more expensive due to the use of more plastic to make the toothbrush. Since toothbrushes made in Injection Molding are solid, the material used to create the toothbrush handle increases approximately with the square of the diameter of the handle.

Second—the cost of manufacture is increased because the time needed to cool and solidify the toothbrush increases considerably with increasing diameter. The increased cooling time is due both to the increased quantity of hot plastic, and the larger cross section of the toothbrush. As plastic has a relatively low thermal conductivity, extracting heat from the center of the brush is substantially more difficult with an increased cross section.

Third—most thermoplastics shrink during cooling and solidification. Shrinkage can be mitigated by packing additional molten plastic into the center of the handle through the injection gate as the outer edges of the handle cool. However this mitigation loses effectiveness as the injection gate is placed away from the thickest portion of the handle, and placement of the gate, which will have some tactile vestige, in the thick, gripping portion of the handle, can lead to dissatisfaction during use. For many toothbrush handle designs, packing alone cannot mitigate the visible surface shrinkage and surface and internal defects associated with an increased handle cross section. These surface defects can be manifested as unintentional variations in surface gloss or texture, which contribute negatively to the look and feel of the part. Internal defects can be manifested as voids or bubbles inside the plastic, which can weaken the handle visibly or invisibly, depending on the degree of transparency of the plastic.

Fourth—the injection molding process requires sufficient energy to fully melt the plastic to a liquid state, so that it can travel under pressure through the runner, nozzle, and gate to completely fill the injection mold cavity.

Fifth—the filling and packing of the plastic into the injection mold cavity requires very high pressures, typically ranging from thousands of pounds per square inch to tens of thousands of PSI, which necessitates mold cavities made from very high-strength materials such as hard steel, which are expensive and time-consuming to create. Further, the very high fluid pressure of the plastic onto the mold cavity surfaces is non-uniform across the cavity, leading to non-uniform wear of the tooling cavity, which ultimately will affect cosmetic features in the molded plastic part.

In an attempt to overcome the difficulties associated with the use of injection molding to produce toothbrush handles having increased diameters, it has been suggested to produce toothbrush handles having a hollow body. For example, EP 0 668 140 or EP 0 721 832 disclose the use of air assist or gas assist technology to make toothbrushes having hollow, large cross-sectional handles. In the disclosed process, molten plastic is injected near the base of the toothbrush handle, wherein subsequently a hot needle is inserted into the molten plastic to blow gas into the molten plastic which is then expanded towards the walls of the injection mold. In a similar manner, U.S. Pat. No. 6,818,174 B2 suggests injecting a predetermined amount of molten plastic into the cavity to only partially fill the mold cavity and subsequently inject a gas through a gas injection port formed in the injection mold to force the molten plastic into contact with the walls of the mold cavity. CN102166064 discloses a hollow toothbrush handle and a method of toothbrush production, in particular toothbrush handle production. When the molten plastic material is injected into the mold cavity of the brush handle, any position of the brush handle is provided with a blow hole, gas is blown into the center of the brush handle through the blow hole, and the blow hole is sealed after the brush handle is shaped. The described toothbrush descried has a hollow handle and solid toothbrush head made through a gas-assisted injection molding process.

To produce void spaces in the molten plastic such injection molding processes inject air at very high pressures, often greater than 1,000s PSI, making it difficult to form hollow handle bodies with substantially uniform wall thickness or with an overmolded second or third shot. The wall thickness of the handle made in this method is not evenly distributed, resulting in less optimal weight distribution for better handle strength. The amount of material saved is also limited to 10~50% handle weight. As such, the potential for material reduction and increased efficiency in manufacturing are limited.

A conventional method to create toothbrush handles having increased cross sections, such as electromechanical toothbrush handles, is to manufacture discrete parts of the handle separately using injection molding, then to assemble these parts in either a separate non-injection molding step, or in a subsequent injection molding step whereby the discrete parts from the first step or steps are inserted into an injection mold first and one or more additional materials are injected around them, creating a hollow body from multiple parts. This manufacturing method still has the drawbacks of: requiring the complete melting of plastic, high pressures, associated equipment involved with injection molding, and in addition may have added labor expense associated with both in-mold and out-of-mold assembly.

In the assembly of a blow molded electromechanical toothbrush it is necessary to leave the blow molded portion of the handle open in at least one end to accommodate the motor, batteries, and drive system components. In this process, the minimum diameter of at least one opening to the blow molded handle must exceed the smallest linear dimension of every component that will be inserted. Such a large opening would be a drawback in a non-electromechanical handle, which has no need to accommodate internal component entry. Further blow molding technology is a high volume manufacturing process. Key challenges for most high volume production is managing variety—like design changes including form, color and decorations. This typically involves switching over certain processes and equipment resulting in equipment downtime. Additionally high volumes of one product design need to be stored or buffered in those cases where different designs want to be combined to be included into one single package. Manual tooth brushes for example are often sold in multipacks that include different colors of the same product form It is possible to make a hollow blow molded or injection molded handle as one part, and an injection molded brush head as another separate part. Then the hollow handle and a solid or partly hollow brushhead can be assembled by snap fitting or gluing or ultrasonic welding or some other assembly method. There are some prior arts in toothbrushes made of a hollow handle and a hollow or solid brushhead. These prior arts are listed below.

In view of these drawbacks of the prior art, it is an objective of the present invention to provide an improved method for producing a toothbrush in one molding process, which avoids the drawbacks of the prior art.

SUMMARY OF THE INVENTION

A method for extrusion blow molding a unitary toothbrush having an inner cavity is provided that comprises providing an extrusion blow mold having a longitudinal axis and a cavity, the cavity having a head portion, neck portion and handle portion and a surface that defines a cross-sectional area; wherein the cavity has at least one of a greater cross-sectional area, bordered by two smaller cross-sectional areas along the longitudinal axis of the blow mold or a lesser cross-sectional area bordered by two greater cross-sectional areas along the longitudinal axis of the blow mold; extruding a parison comprising a thermoplastic resin, the parison includes an interior cavity and an outer surface, wherein the outer surface defines a cross-sectional area of the parison; closing the blow mold; expanding the parison using a fluid to contact the cavity surface and subassembly to produce a toothbrush handle having an inner cavity.

A method for extrusion blow molding a unitary toothbrush having an inner cavity is provided that comprises providing an extrusion blow mold having a longitudinal axis and a cavity, the cavity having a head portion, neck portion and handle portion and a surface that defines a cross-sectional area; wherein the cavity has at least one of a greater cross-sectional area, bordered by two smaller cross-sectional areas along the longitudinal axis of the blow mold or a lesser cross-sectional area bordered by two greater cross-sectional areas along the longitudinal axis of the blow mold; extruding a parison comprising a first thermoplastic material and a second thermoplastic material, the parison includes an interior cavity and an outer surface, wherein the outer surface defines a cross-sectional area of the; closing the blow mold; expanding the parison using a fluid to contact the cavity surface and subassembly to produce a toothbrush handle having an inner cavity.

DETAILED DESCRIPTION OF THE INVENTION

In the following description, the invention is discussed in terms of a manual toothbrush, and method of manufacturing the same, wherein the toothbrush is a unitary single piece (unitary toothbrush) with an inner cavity at the handle and the neck made in one molding process. However, in other forms, the invention could be in the form of other household cleaning articles or personal care articles that share similar features, such as a handle and tufts or tuft holes. It is also to be understood that other embodiments may be utilized, and that structural and functional modifications may be made without departing from the scope of the present invention.

Personal care articles are items used to store, dispense, apply or deliver benefits to a consumer's personal health, beauty, grooming, or other body or human biological system care, maintenance, enhancement or improvement. Examples of personal care articles include, but are not limited to toothbrushes, toothbrush handles, razors, razor handles, mop handles, vacuum handles, makeup or beauty care applicators, skin care applicators, feminine hygiene applicators, hair care applicators, hair colorant applicators, or hair care articles.

Figure 1:
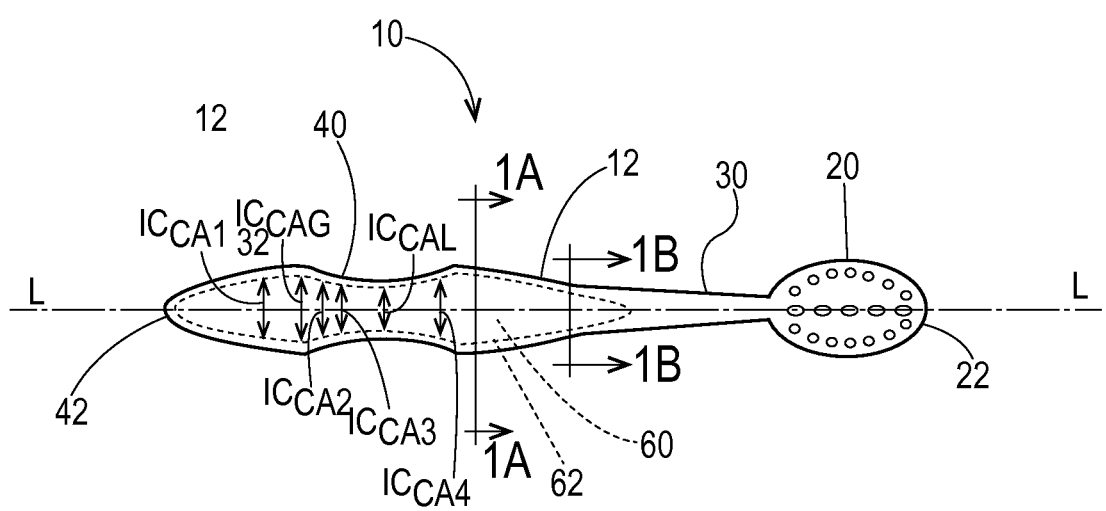
FIG. 1 is a perspective view of a toothbrush according to an embodiment of the present invention.
Figures 1A, 1B:
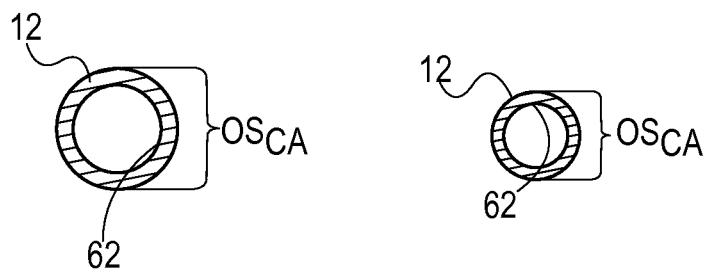
FIG. 1A is a cross-sectional view of FIG. 1 along section line 1A according to an embodiment of the present invention.
FIG. 1B is a cross-sectional view of FIG. 1 along section line 1B according to an embodiment of the present invention.

FIG. 1 shows an embodiment of a personal care article, a toothbrush 10 having a head 20, neck 30, handle 40, a handle end 42 and a head end 22. The toothbrush 10 may be unitarily formed as a single piece and comprise an inner cavity 60 and an outer surface 12, wherein the outer surface 12 varies in cross-sectional area ($OS_{CA}$), which is the total area of the cross-section as defined by the outer surface 12, along the toothbrush 10 longitudinal axis L—as shown in FIG. 1A; in this embodiment the handle 40 has a substantially hourglass shape. The inner cavity 60 has an inner cavity surface 62, wherein the inner cavity surface 62 varies in cross-sectional area ($IC_{CA}$) along the toothbrush longitudinal axis L. As FIG. 1 shows, in certain embodiments the inner cavity 60 of the toothbrush 10 has a greater cross-sectional area $IC_{CAG}$ bordered along the longitudinal axis L of the toothbrush 10 by cross-sectional areas $IC_{CA1}$, $IC_{CA2}$ having a smaller area than the area of the greater cross-sectional area $IC_{CAG}$, to form a contour. A toothbrush 10 inner cavity 60 may also have a lesser cross-sectional area $IC_{CAL}$ bordered along the longitudinal axis L of the toothbrush 10 by cross-sectional areas $IC_{CA3}$, $IC_{CA4}$ having a greater area than the area of the lesser cross-sectional area $IC_{CAL}$, to form a contour. In another embodiment, the cross-sectional area at the handle end of the brush is smaller than at least one or more other cross-sectional area along the longitudinal axis L of the toothbrush 10.

Figure 2:
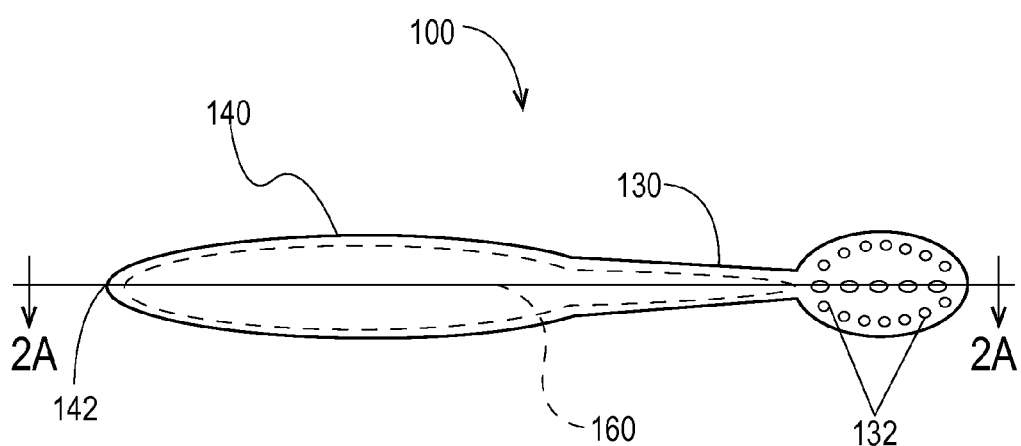
FIG. 2 is a perspective view of a toothbrush according to an embodiment of the present invention.
Figure 2A:
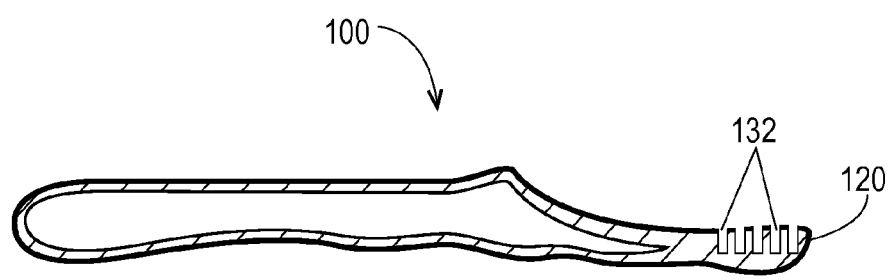
FIG. 2A is a sectional view of FIG. 2 along section line 2A according to an embodiment of the invention.

Further, as shown in FIG's 1, 1A and 1B, in certain embodiments the inner cavity surface 62 varies in cross-sectional area proportionally to the variations in the cross-sectional area of the outer surface 12 along the longitudinal axis L of the toothbrush 10, except at the very end of the inner cavity along the longitudinal axis L of the toothbrush 10. As shown in FIG. 1 the head 20 and at least a portion of neck 30 along the longitudinal axis L of the toothbrush 10 may be substantially solid or as shown in FIG. 2 in a toothbrush 100 the inner cavity 160 may extend from the handle 140 into the neck 130 but not passing into the head 120 of the toothbrush 100, as determined by a first tuft hole 132 closest to the handle end 142 of the toothbrush 100. In certain embodiments, the percentage of air void volume to the volume of the brush handle and neck ranges from about 50% to about 70% or from about 55% to about 70%; meaning the same percentage of material is saved compared to a solid toothbrush with the same or similar shape and size. FIG. 2A is a longitudinal cross-sectional view of the toothbrush 100 of FIG. 2 showing tuft holes 132 extending in the toothbrush head In certain embodiments, the wall thickness of the hollow portion of the unitary toothbrush, as determined by the distance between the outer surface of the toothbrush and the inner cavity surface, can be evenly distributed and as thin as about 0.5 mm to about 5 mm In certain embodiments the average wall thickness of the hollow portion of the toothbrush, as determined by the average of all measured thickness along the circumferential direction of the cross-section, is about 1.0 mm to about 2.0 mm with a standard deviation of the wall thickness being less than 25% of mean wall thickness.

Figure 3:
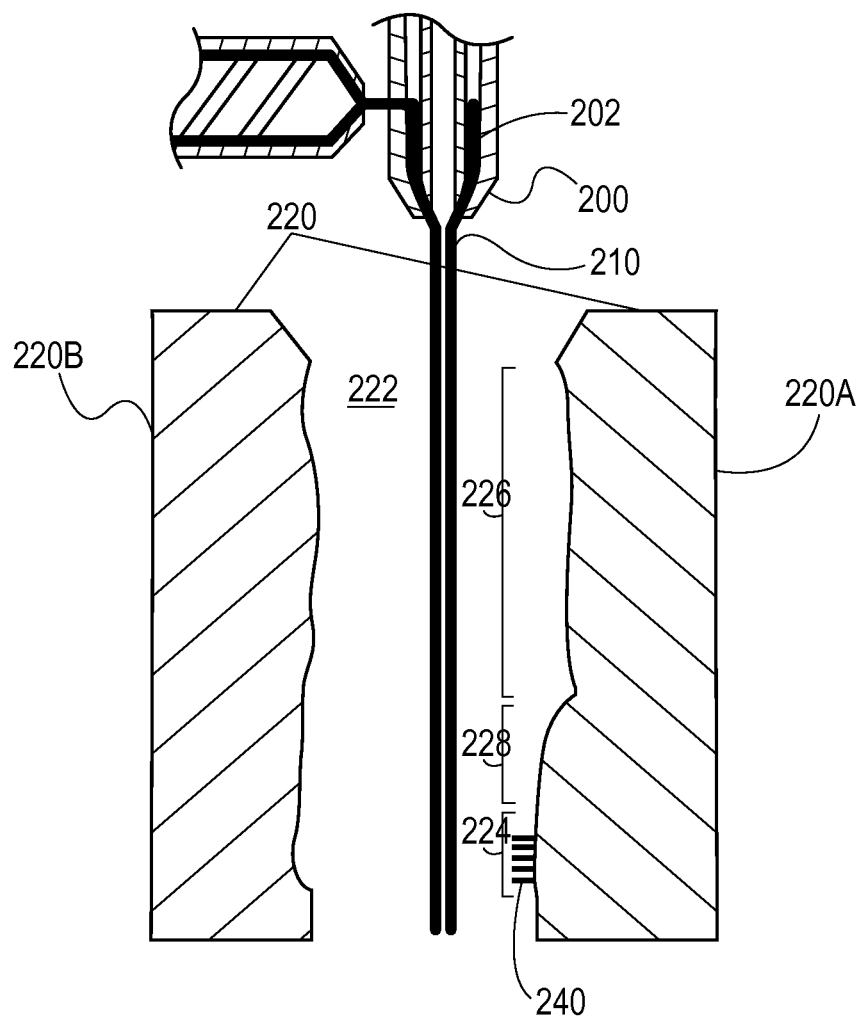
FIG. 3 is a sectional view of an extrusion step in an extrusion blow molding process according to an embodiment of the present invention.
Figure 4:
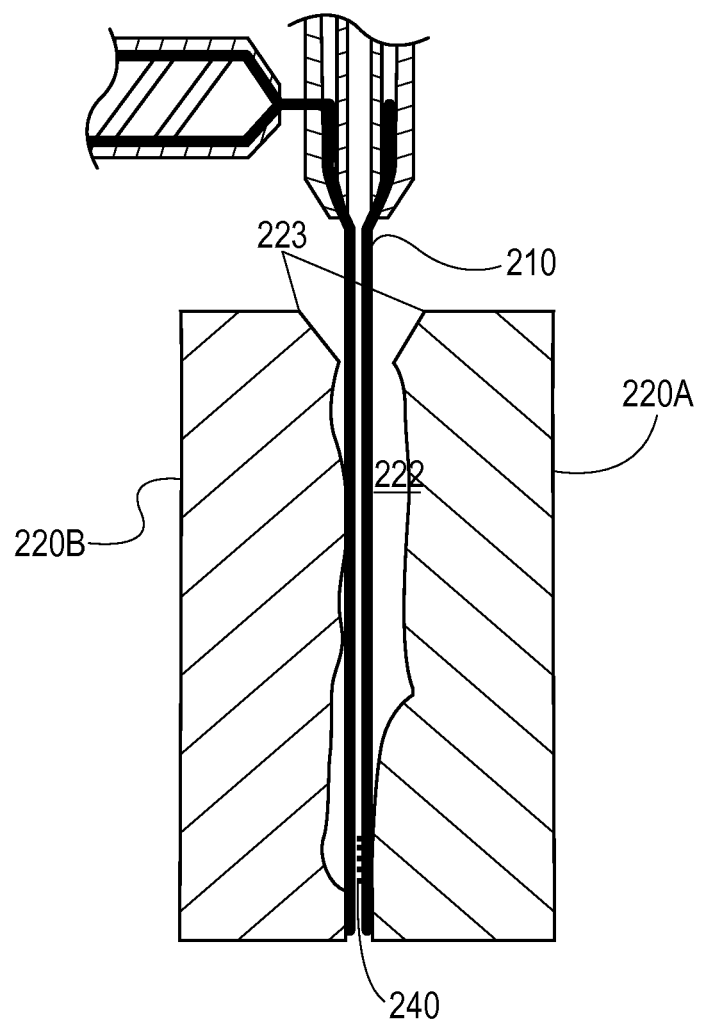
FIG. 4 is a sectional view of an extrusion step in an extrusion blow molding process according to an embodiment of the present invention.
Figure 5:
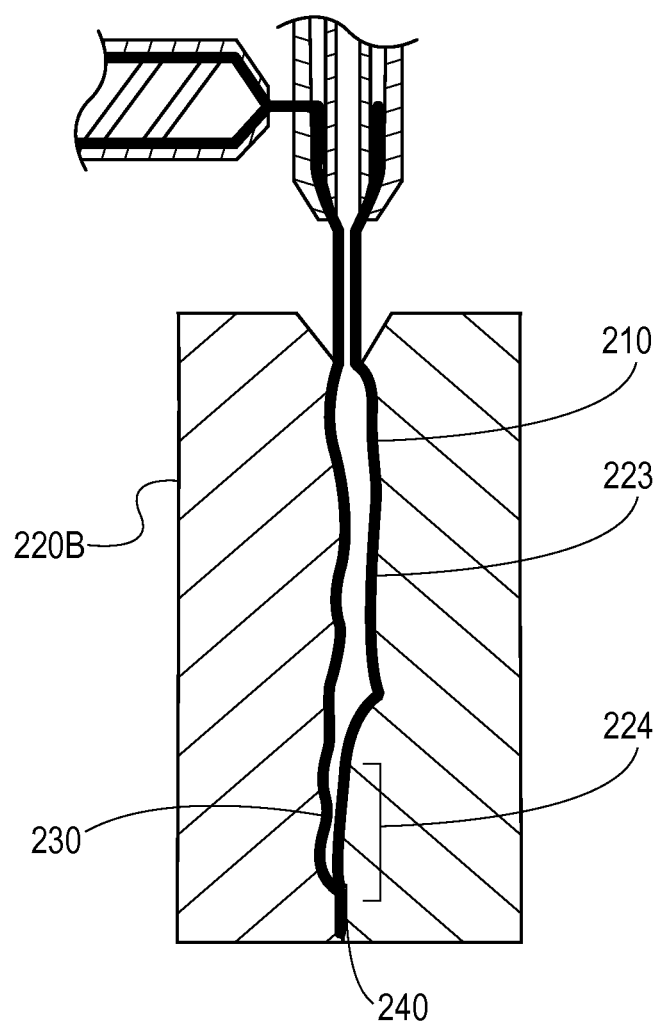
FIG. 5 is a sectional view of an extrusion step in an extrusion blow molding process according to an embodiment of the present invention.

A method of molding a unitary toothbrush is depicted in FIGS. 3 to 5 and described below. As shown in FIG. 3 a thermoplastic resin is heated into a molten state at a given temperature (head temperature) and extruded through a die 200 and mandrel 202 to form a tube or parison 210. Two mold halves comprising a front mold half 220A which forms the front side of the toothbrush and a back mold half 220B which forms the rear side of the toothbrush form the mold 220 and mold cavity 222 with the shape of a toothbrush. In certain embodiments, the front mold half 220A has multiple tuft hole pins 240 extending into the mold cavity 222 to form the blind tuft holes in a toothbrush head. The mold cavity 222 comprises a head portion 224, handle portion 226, and neck portion 228 which is positioned between the head 224 and handle 226 portion, wherein each cavity portion corresponds to the part formed on a unitary toothbrush.

As shown in FIG. 4 when the mold halves 220A, 220B close around the parison 210 a majority portion of the parison 210 is contained within the mold cavity 222. A blow pin can then be inserted into the blow pin cone 232 at the top of the mold 220 and introduce fluid, such as compressed air into the parison 210 inside of the mold cavity 222. The pressure of the compressed air may be between about 3.4 bar to 6.9 bar or about (4.1~5.5 bar).

Figure 5A:
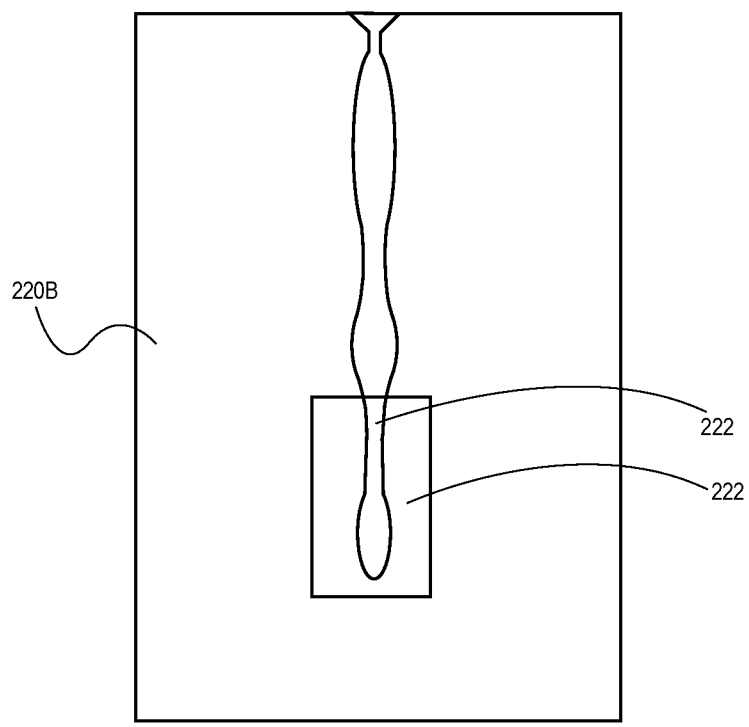
FIG. 5A is a frontal view of a mold half.
Figure 6:
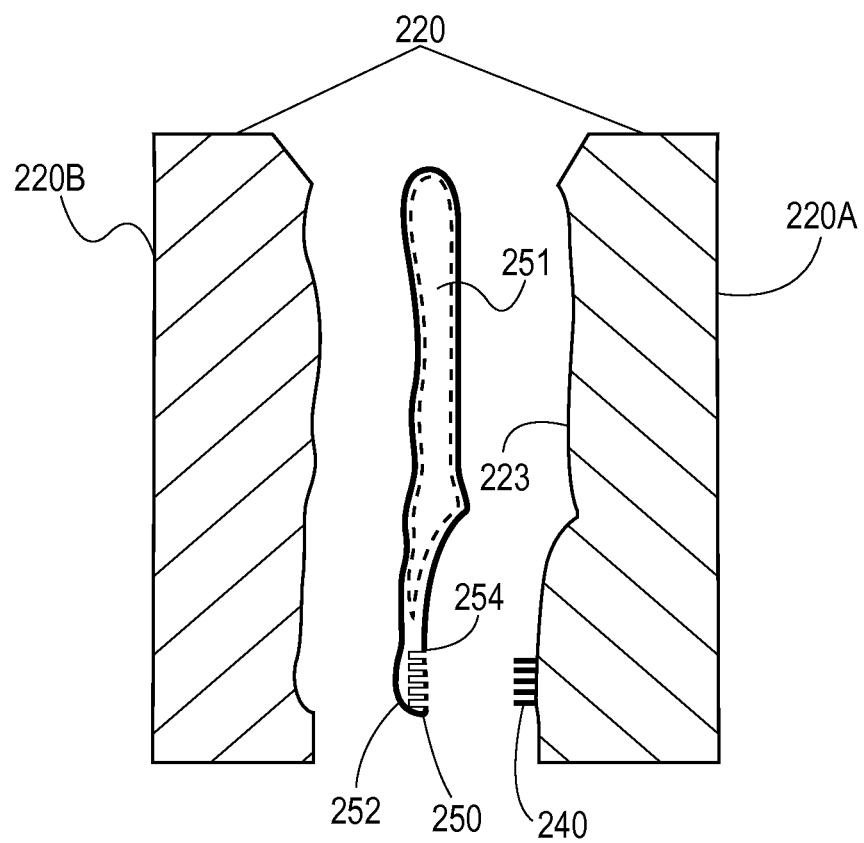
FIG. 6 is a sectional view of an extrusion blow mold process for producing a personal care article according to an embodiment of the invention.

FIG. 5 shows that the blown air inflates the parison 210 and expands the parison 210 against the mold cavity surface 223 while cooling the parison 210 and holding the air pressure. As shown in FIG. 5 and FIG. 5A, which is a frontal view of the back mold half 220B, there also may be a flash pocket 230 positioned around the toothbrush head portion 224 of the mold cavity 222 to hold any extra material from the parison 210. After a given amount of time, called blown period T about 10 to 20 seconds the parison 210 will be cooled and hardened enough and the compressed air is stopped. And as FIG. 6 shows, the mold halves 220A, 220B separate and a hollow toothbrush 250 having an inner cavity 251 is ejected from the mold 220. Any extra plastic material in the flash pocket 230, as shown in FIG. 5A becomes flash, which can be removed.

In addition to the extrusion blow molding process described above, as shown in FIG. 3-6, an array of blind tuft holes 254 may be made in a toothbrush head 252 from pins 240 extending from the mold cavity surface 223 in the same molding process as a unitary toothbrush 250 is made. The tuft holes may be arranged such that when tufts are stapled into the tuft holes, the unitary toothbrush will have a tuft pattern to effectively clean teeth.

Figure 7:
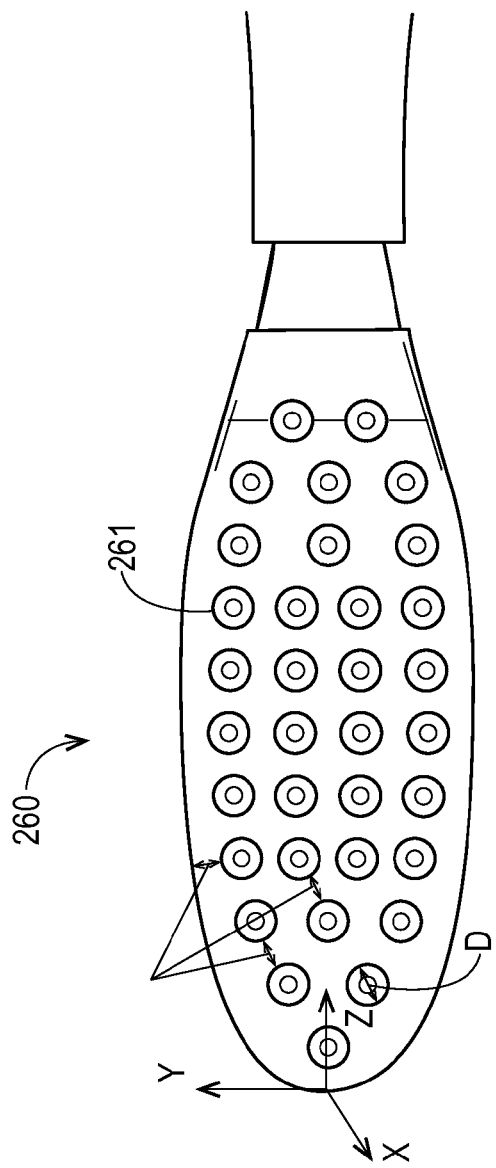
FIG. 7 is a frontal view of a toothbrush head according to an embodiment of the present invention.
Figure 7A:
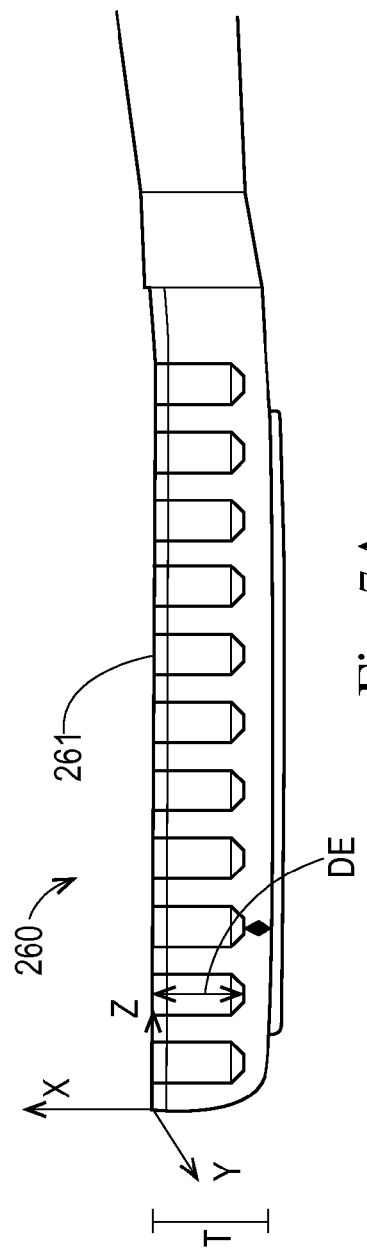
FIG. 7A is a side view of a toothbrush head according to an embodiment of the present invention.

In certain embodiments, on a toothbrush head 260, as shown in FIG. 7 the tuft hole 261 diameter (D) or cross-dimension may range from about 1.5 mm to about 3 mm or from 1.5 mm to about 2.5 mm or from about 1.7 mm to about 2.2 mm The gap distance (GD) between neighboring tuft holes 261 and the gap distance between tuft holes 261 near the toothbrush head 260 edge and the edge can be from about 0.5 mm to about 1.5 mm or from about 0.6 mm to about 1 mm As shown in FIG. 7A the depth (DE) of a tuft hole 261 as measured from the toothbrush head 260 surface may range from about 2.0 mm to about 4.5 mm or from about 2.5 mm to about 4.0 mm While the thickness (T) of a brush head 260 may be from about 2.5 mm to about 7 mm or from about 3.5 mm to about 5 mm The number of tuft holes 261 on a toothbrush head 260 may range from about 20 to about 60 or from about 30 to about 50.

Figure 8:
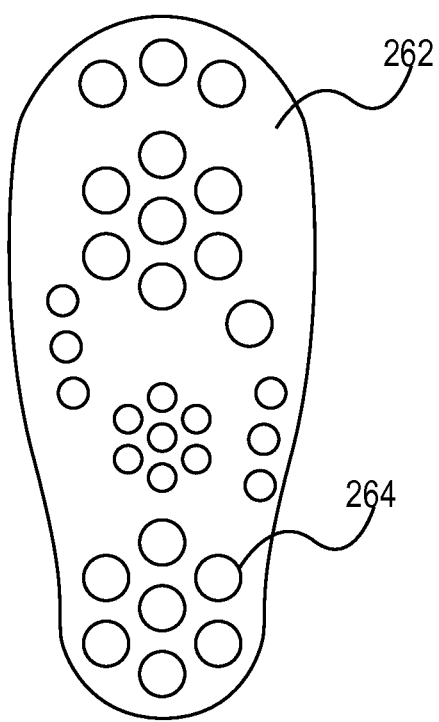
FIG. 8 is a frontal view of a toothbrush head having tuft holes according to an embodiment of the present invention.
Figure 9:
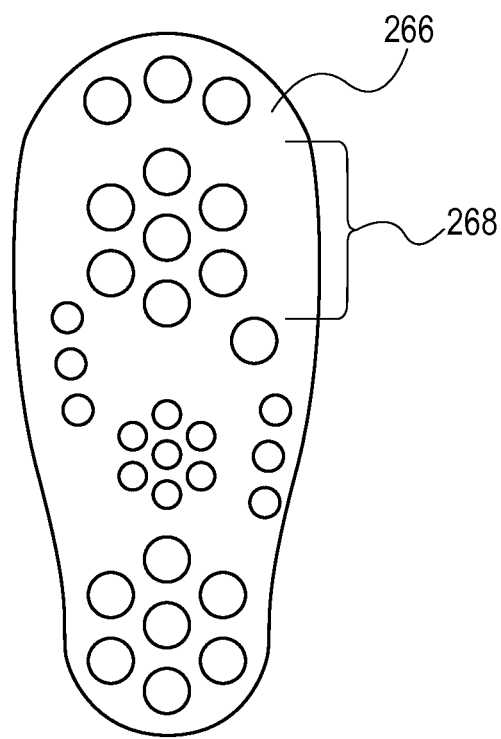
FIG. 9 is a frontal view of a toothbrush head.

The production of so many tuft holes in such a limited and contained space, such as the toothbrush head mold cavity portion is a large strain or large deformation phenomenon of half molten thermoplastic resin. Traditional extrusion blow molding processes in which compressed air, with a gauge pressure not exceeding 6.9 bar, blowing into the parison along the entire longitudinal axis cannot make a unitary toothbrush with such a large number of small closely packed tuft holes. For example if the parison thickness Tp is too thin at the brush head, there would not be enough material to fully fill the brush head part of the mold cavity. As a result, the blown air will blow into the brush head area of the parison in the mold cavity. The air pressure, usually <6.9 bar is not high enough to deform the parison wall to fully contact all surfaces of the mold cavity wall and tuft pins at the brush head. As a result, instead of forming a brush head having well formed individual tuft holes 264 in the toothbrush head 262 as in FIG. 8, a toothbrush head 266 is formed having large recesses around groups of holes 268—see FIG. 9. Tufts cannot be stapled into these large recesses at the toothbrush head. As such a toothbrush head with a number of tuft holes cannot be effectively molded using conventional extrusion blow molding air pressure. While not being limited to theory, in order to form tuft holes in a toothbrush head using extrusion blow molding, it takes a combination of material properties and process steps.

To produce a unitary toothbrush with blind tuft holes and inner cavity a combination of compression molding at the toothbrush head and blow molding at the handle and neck is used. This can be achieved by making the parison thickness Tp at the toothbrush head thick enough so that when the mold closes, the thermoplastic resin of the parison fully fills the space in between the tuft pins and mold cavity walls of toothbrush head portion of the mold cavity. The half molten parison is deformed by the compression pressure of the two mold halves and conforms to the shape of the tuft pins.

Usually in an extrusion blow molding process, the semi-molten thermoplastic material is extruded at a temperature sufficiently high to create a homogeneous amorphous structure in the continuous parison, but also at a temperature sufficiently low to allow the parison to carry some load across its longitudinal direction; as the parison 420 may either hang vertically from the extrusion point, or may be carried or pulled in a non-downward direction. In order for the molten parison to flow into the space between the tuft hole pins, the molten parison should have the right viscosity and the compression pressure should be high enough to allow the molten parison material to flow with high deformation. If the molten parison is too viscous, then it cannot flow all the way into the small space between the tuft hole pins, which results in weld lines between neighboring tuft holes or recessed gap between the tuft holes or only partially formed tuft holes. If the molten parison is too fluid, then the parison might not be strong enough to be blown.

The parison viscosity is primarily controlled by two factors: the melt flow index of the thermoplastic resin used and the temperature of the parison at the toothbrush head portion in the mold cavity. Typically, the melt flow index (MFI) of a thermoplastic resin is measured at a temperature of 236° C. and a specific force 2.16 kg. The higher the MFI of the thermoplastic resin, the lower the viscosity of the molten thermoplastic material at a specific temperature, for example, 236° C. The temperature of the parison is controlled by the head temperature (temperature at which the parison exits the die and mandrel), usually around 180° C. to 220° C. and cooling time of the parison after extrusion. If the head temperature is increased, then the viscosity of the half molten resin could be further reduced. For example a blow molding grade polypropylene resin with a MFI of 2 g/10 min (Dow 334 PP) is able to consistently form tuft holes at about 210° C. to about 220° C. with a parison cooling time or cycle time of around 25 s. Wherein parison cooling time is defined as the time from when the head part of the parison first leaves the die to the time when the head part of the parison is being pushed into the mold cavity. Whereas, a blow mold grade polypropylene resin with a low MFI such as 0.37 to 0.47 g/10 min (Profax 7823 PP), at about 210° C. to about 220° C. will not be able to consistently form tuft holes. Blow molding grade thermoplastic resins usually have a maximum MFI of 2 g/10 min Resins with a higher MFI, such as 4-6MFI, become injection grade thermoplastic resin and are too watery to form a strong parison that can be blown at regular blow molding temperature, such as about 180° C. to about 220° C. Therefore, in certain embodiments the MFI of the thermoplastic resin may be in the range of about 1g/10 min to about 4 g/10 min, with a head temperature of about 180° C. to about 220° C. As the parison is extruded from the die, it starts to cool down. The longer the cooling time of the head part of the parison, the lower its temperature would be and the more viscous it would become. Hence it is desirable to have a short parison cooling time such as 15s to 25s. The parison cooling time is also parison extrusion time. So there are other factors that may determine the parison cooling time such as parison feed rate, die swell and desired parison diameter relative to die and mandrel size.

The compression pressure in the mold cavity at the toothbrush head portion should be high enough, at least greater than about 6.9 bar, to deform the molten parison. In certain embodiments, the pins that form the tuft holes are fixed metal pins, such as aluminum pins, originating from the mold cavity surface as one continuous part. As the mold closes, the two mold halves grab the parison which fills up the mold cavity at the toothbrush head portion. The compression pressure comes from the closing action of the mold and compressing the tubular parison into the shape of the mold cavity and tuft hole pins. The highest pressure occurs at the tip of the pin, as that's where the most amount of compression or deformation of the parison happens. This works well with compression molding, since the highest compression pressure happens where the most amount of compression deformation of the parison occurs. In compression molding, the typical pressure applied ranges from 10 bar to several hundred bar. As the part continues to cool down, the tuft holes will shrink against the pins. As a result, the dimension of the tuft holes is very precise and accurate.

Figure 10:
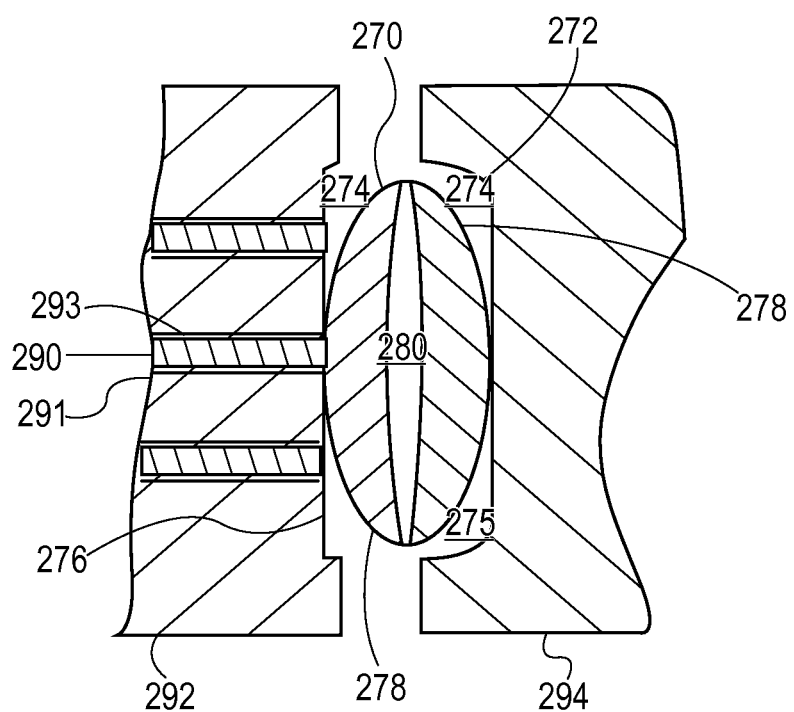
FIG. 10-11 is a cross-sectional view of a tuft hole forming step in an extrusion blow molding process according to an embodiment of the present invention.
Figure 11:
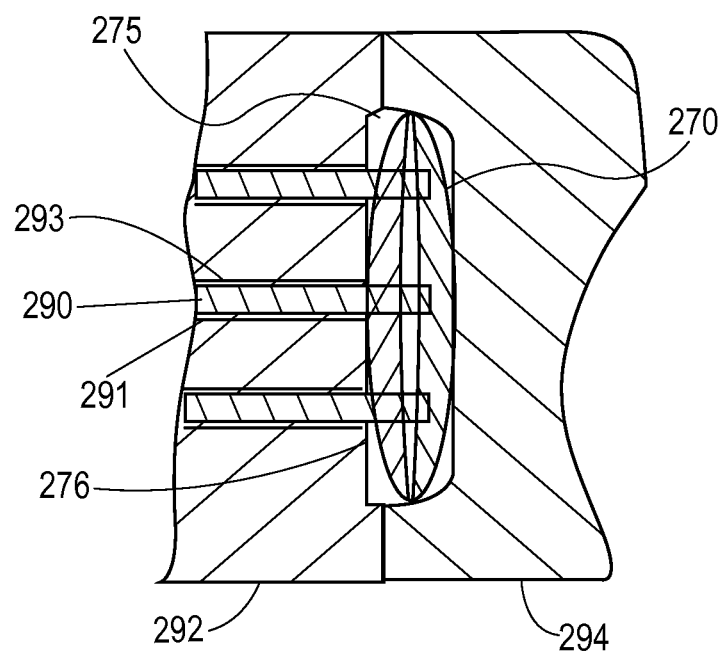

Another factor affecting the formation of tuft holes, as shown in FIGS. 10 and 11, which depict a cross-sectional view of a parison 270 in a mold cavity head portion 272, is that there could be air voids 274 between the mold cavity surface 276 and the parison external surface 278 and air voids 280 within the parison 270. If the air voids 274, 280 remain as the parison 270 hardens, they will create surface defects in the form of surface holes, internal defects in the form of trapped air bubbles, or both.

To relieve any trapped air bubbles, one method is to close the mold with fixed tuft hole pins slowly by about 1 second to about 3 second, to give trapped air between the toothbrush head front side mold cavity wall and parison extra time to escape from in between the pin down to the handle. Another method is to add vents in the back mold half at the toothbrush head portion and on the front mold half at the toothbrush head portion in between the tuft hole pins to enable the trapped air to vent out of the mold through the vents. Yet another method to increase the amount of vent is to separate the tuft hole pin and the front mold half, as shown in FIGS. 10 and 11. So that at each tuft hole pin there are vents between the tuft hole pin and the front mold half at the toothbrush head portion on the mold cavity, allowing the parison to vent through each tuft hole pin—producing tuft holes without trapped air bubbles or surface defects.

In certain embodiments the tuft hole pins are fixed. The compression pressure won't increase anymore after the mold fully closes and may even decreases as the parison in the head portion cools down and shrinks away from the mold cavity wall. As a result, sink may show up on the side of the brush head or on the back of the brush head. Most of time, the sink only influences appearance of surface finish, which can be camouflaged by adding color or transparency as well as texture on the surface of the brushhead. When plastics cool down, it will shrink. With the tuft pin in place, the plastics will shrink no smaller than the tuft pin size. The plastics will actually cling very tightly to the tuft pings due to shrinkage, as a result, it take a huge amount of force to pull the brush head out of the tuft pins. It is also desirable to add about a 1 to about 5 degree of draft on a tuft hole pin so that the toothbrushes can be ejected. The bigger the draft angle is, the more easily the molded toothbrush can be ejected from the mold.

Figure 12:
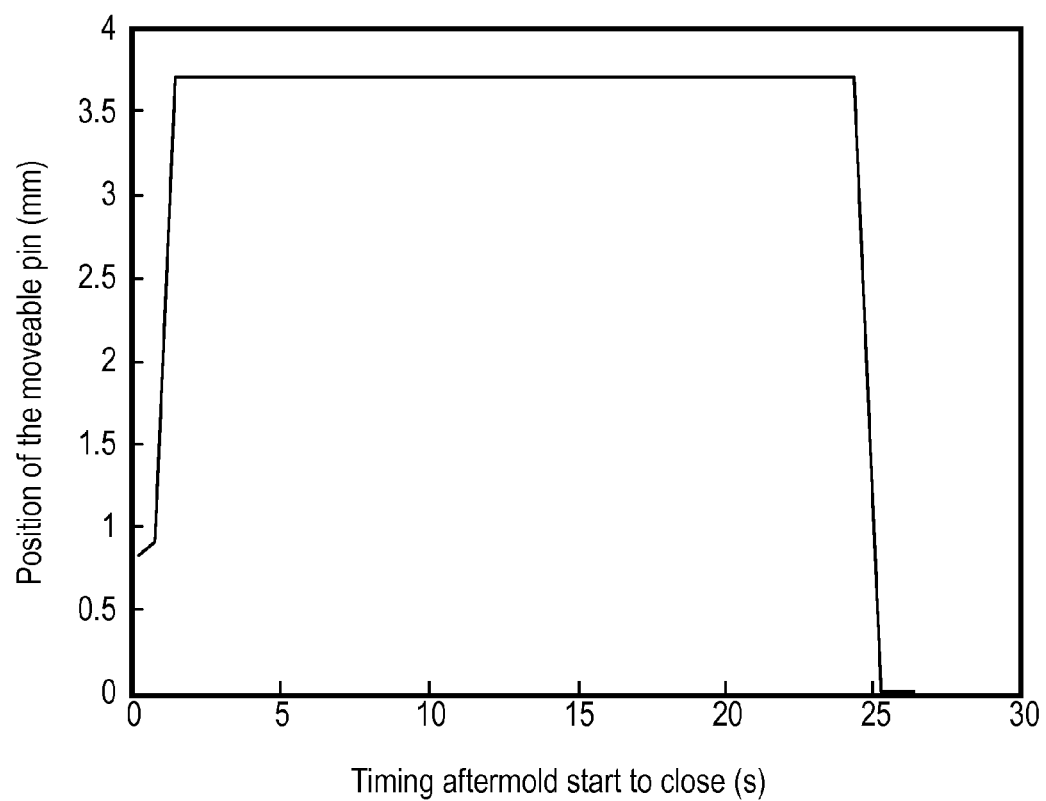
FIG. 12 is a graph illustrating the position of the moveable pins over time.

In certain embodiments, as shown in FIGS. 10 and 11 tuft hole pins 290 (moveable tuft hole pins) can independently extend or retract into the mold cavity 275 independent from the closing and opening of the mold. Under independent control, such as through the use of hydraulics, pneumatic actuators, or electric servo motors, the tuft hole pins 290 can slide freely into and out of the mold cavity 275. One or more of the tuft hole pins 290 may have a gap between the tuft hole pin outer surface 291 and the sleeve surface 293 in which it is positioned, allowing for the venting of void space air. As the front mold half 292 and back mold half 294 start to close and grab the parison 270, the moveable tuft hole pins 290 extend into the mold cavity 275 to compress on the parison 270. The position of a moveable tuft hole pin 290 is defined as the normal distance from the tip of the tuft hole pin to the mold cavity surface 276 from which the tuft hole pin 290 extends. An example of the function of a moveable tuft hole pin position to time is displayed in FIG. 12. The timing of a moveable tuft hole pin can affect the formation of tuft holes. For example, if a tuft hole pin extends into the mold cavity too late, the parison cools down too much and begins to harden, as such the tuft hole become rounded at the top edge. If the tuft hole pin extends earlier and faster into the mold cavity, the parison will have a higher temperature and be less viscous, which will produce a tuft hole with little to no faults. However, the sink on the backside of the toothbrush head will be increased. In certain embodiments the starting position of the tuft pin may be from 25% to 50% of the tuft hole depth. The ending position of tuft pin is 100% of the tuft hole depth. A tuft hole pin may be held at the starting position from 0s to about 1.0 after the mold is closed. A tuft hole pin may reach 100% tuft hole depth at between about 1.0 and 2.0 seconds.

Following the full desired extension of the tuft hole pins into the mold cavity, the moveable tuft hole pins may remain fully extended for about 5 seconds to about 20 seconds. At about 1 to 2 seconds before the mold opens and part is ejected, the moveable tuft hole pins may then retract to 0~25% of the extension to enable part ejection.

As the tuft hole pins retract prior to the toothbrush being ejected from the mold cavity, the tuft holes do not have to have a draft angle to aid in ejection. This allows for straight tuft holes. Straight tuft holes increases tuft retention and maximizes the number and types of tufts that can fit into a tuft hole as compared to a tuft hole having a draft angle.

In certain embodiments the mold for an extrusion blow molding process can be made of one or more metals, for example aluminum. For molds comprising aluminum and having fixed tuft hole pins, the tuft hole pins may also be made of aluminum, which has a high thermal conductivity. So the external layer of a parison contacting the aluminum mold cavity surface and tuft hole pins cools down very fast. In certain embodiments molds comprising aluminum and having moveable tuft hole pins, one or more of the tuft hole pins can comprise steel. At typical blow molding temperatures 180° C. to about 220° C., steel has a much lower thermal conductivity of 12~45 Watt/(meter.K), which is at least 5 times less than that of Aluminum. Hence, the parison contacting the steel moveable tuft hole cools much slower than when the parison contacts aluminum. When the parison is at higher temperature, it has lower viscosity and can flow more easily at the same pressure than a parison at a lower temperature, enabling the formation of tuft holes having no or minimal defects. The other part of the mold comprising aluminum allows the parison to cool faster and have a quicker overall cycle time, as compared to a mold comprising steel.

Figure 13:
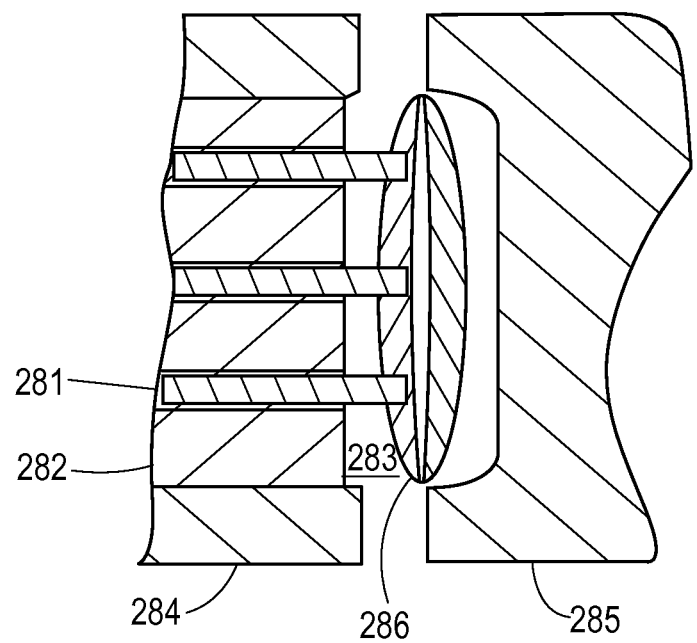
FIG. 13-13A is a cross-sectional view of a tuft hole forming step in an extrusion blow molding process according to an embodiment of the present invention.
Figure 13A:
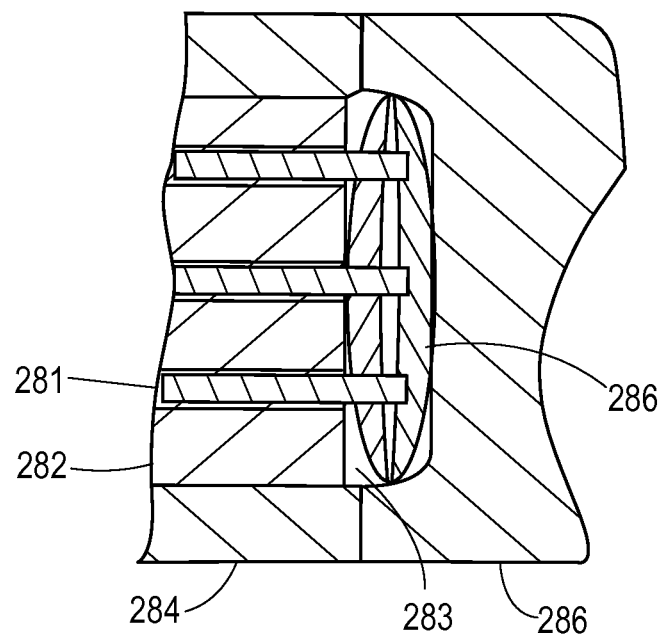

As shown in FIGS. 13 and 13A in yet another embodiment, a blow mold may have separate tuft hole pins 281 and a front brushhead base plate 282. As the front mold half 284 and back mold half 285 start to close and grab the parison 286 the brushhead base plate 282 and tuft hole pins 281 extend together into the mold cavity 283. The end position of the brushhead base plate 282 and tuft hole pins 281 is fixed to create the desired tuft holes. The movement of the brushhead base plate exerts additional pressure on the parison as it starts to cool down and shrink away from the mold cavity surface.

Figure 14:
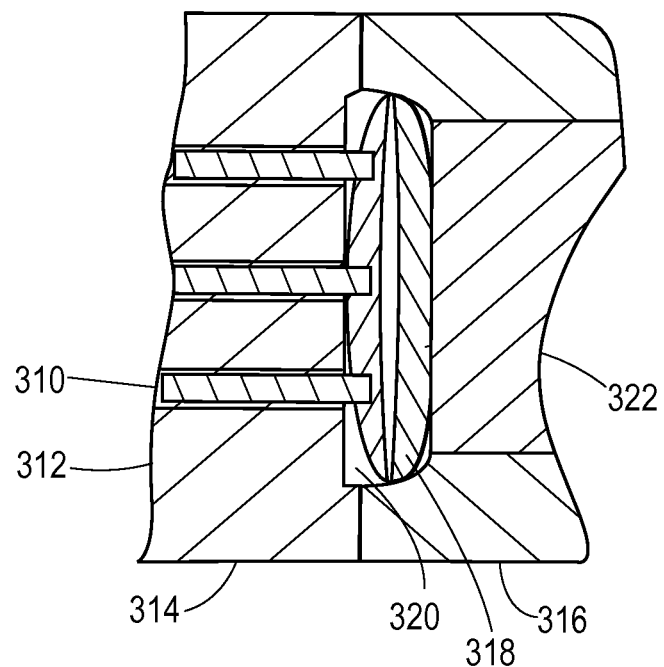
FIG. 14-14A is a cross-sectional view of a tuft hole forming step in an extrusion blow molding process according to an embodiment of the present invention.
Figure 14A:
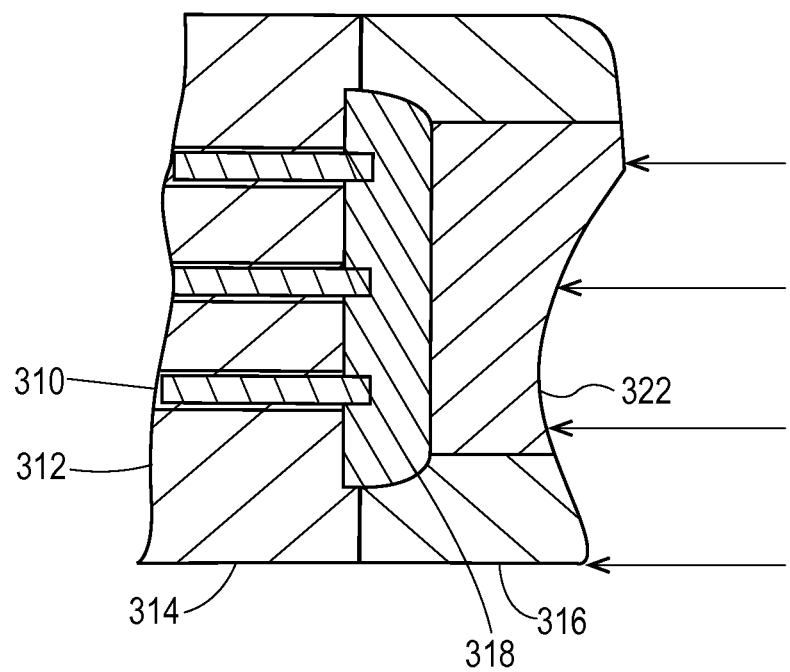

As shown in FIGS. 14 and 14A in certain embodiments, a blow mold may have separate tuft hole pins 310 and a front brushhead base plate 312. Only the tuft hole pins 310 are moveable. As the front mold half 314 and back mold half 316 start to close and grab the parison 318, the moveable tuft hole pins 310 extend into the mold cavity 320 to compress on the parison 318. The tuft hole pin extension would be the same as described with reference to FIG. 10. On the back mold half 316 at the brush head portion there is a separate back plate 322, that can moved into the mold cavity 320 to provide additional compression pressure after the mold closes. In one embodiment, the back plate is pushed against the brushhead in the mold cavity by a back pressure of at least 6.9 bar. This will hold the compression pressure on the molten plastics in the brush head portion of the mold cavity while it cools down. As a result, sink is reduced or removed. The back pressure could be a constant pressure or a time varying pressure. The position and timing of the back plate can also be controlled by a hydraulic system and a feedback controller. Instead of holding a constant pressure, the back plate can move into the mold cavity at a set distance every second for the first 5 seconds, for example, 1 mm/s or can move from starting position as shown in 14 to ending position shown in 14A. The position and timing of the back plate is independent of the position and timing of the tuft pins. Alternatively, without a feedback servo controller, a hydraulic line directly controls the 2 or 3 positions of the tuft pins or the back plate at the specific timing will provide the right type of movement for the moveable tuft pins and the moveable brush head back plate on the mold.

Compared to other bottle blow molding, the cross-section size of the toothbrushes is much smaller than that of the traditional bottle. One benefit of extrusion blow molding toothbrushes is that the toothbrushes can have larger handler size than injection molded toothbrushes.

Figure 15:
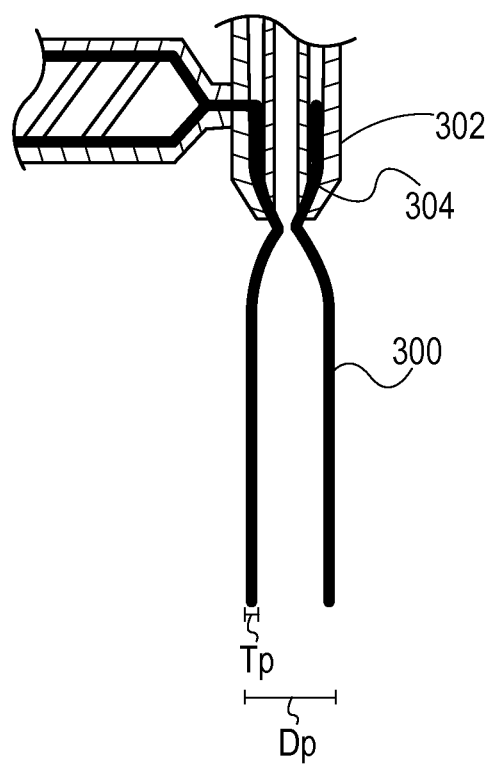
FIG. 15 is a sectional view of a parison being extruded according to an embodiment of the present invention.

One of the side effects in the blow molding process is that undesirable flash could be generated. In order for the toothbrush to have as little amount of flash as possible when toothbrush first comes out of mold, the parison can be positioned such that the majority of the parison is inside of the mold cavity having the shape of the toothbrush, as any part of the parison that does not fit into the mold cavity will be squeezed out side of the mold cavity and further compressed into the flash pocket and becomes flash. As shown in FIG. 15 a parison 300 generally has a cylindrical tube shape, with an outer diameter $D_p$ and thickness $T_p$. For a given mold, the outer diameter of the parison decides whether a parison will fit into the mold. In certain embodiments the parison outer diameter $D_p$ may be smaller than the smallest cross-dimension of the mold cavity at the handle portion so that there is little to no flash formed at the handle of the toothbrush. The cross-dimension of the mold cavity is defined by the distance between the two intersections of any straight line passing through the center of mass of the cross-section with the cross-section. A cross-section of irregular shape will have many cross-dimensions with a maximum cross-dimension and a minimum cross-dimension. For example, in certain embodiments the mold cavity at the handle potion may have a cross-dimension of about 10 mm to about 20 mm, therefore a parison may have a $D_p$<10 mm. Whereas, in certain embodiments at the head and neck portions of the mold cavity, compression molding is being used, the mold cavity will be substantially filled with the parison and the extra the parison plastics is squeezed out of the mold cavity into a flash pocket, producing flash. To reduce the overall amount of flash of the toothbrush, a parison having a reduced outer diameter $D_p$ and increased thickness $T_p$ is desirable. To make a typical toothbrush with a wide ergonomic handle and inner cavity, a desirable $D_p$ may be in the range of 6 to 12 mm or 6 to 10 mm Tp may be in the range of 1.3 mm to 2.5 mm at the handle portion and in the range of 2 to 3.5 mm at the head portion As shown in FIG. 15 the parison 300 outer diameter $D_p$ is controlled by the size of a die 302 and mandrel 304 and the die swell ratio. The die swell ratio is a function of resin feed speed or extrusion speed, temperature of parison, gap between die and pin, support air flow rate and resin melt flow. The higher the resin feed speed or the faster the parison exits the die, the bigger the die swell ratio would be and the bigger the parison diameter would be. So it is advantageous to have a slow resin feed rate so that the die well is low. In one or more embodiments, the toothbrush head portion may be located at the bottom of the mold cavity, and a parison has greater thickness $T_p$ in the areas that will form the toothbrush head as compared to the toothbrush handle, that the parison will have more material to fill the toothbrush head portion of the mold cavity. The extra weight at the bottom area of the parison will help to stretch the parison at the handle area to further reduce the diameter $D_p$ of parison and hence the flash at the handle area.

On the other side, given the overall length of parison, the slower the resin feed speed, the longer the parison left the die and mandrel, the greater the cooling the bottom of the parison will have.

The thickness of a parison can be controlled along the longitudinal direction through a controller, such as a hydraulic controller. With reference to FIG. 15 the position of mandrel 304 may be moved up and down to allow variation of the wall thickness of the parison 300.

In certain embodiments the thickness of the parison that will form the toothbrush head may be from about 1.5 mm to about 3.5 mm or from about 2 mm to about 3 mm. In certain embodiments the thickness of the parison that will form the handle and neck of the toothbrush may be from about 2 mm to about 3.5 mm In certain embodiments, if the parison diameter is larger than the maximum width of the toothbrush, the parison thickness at the head portion may exceed half the thickness of the brushhead as shown in FIG. 14.

The unitary toothbrush can be stapled with tufts into all the tuft holes on the brush head to make a tufted toothbrush. The material of tuft can be nylon, PBT, nylon with silver ions, etc. Any bristle material that can be stapled into an injection molded toothbrush can also be stapled into the unitary toothbrush with inner cavity.

Figure 16:
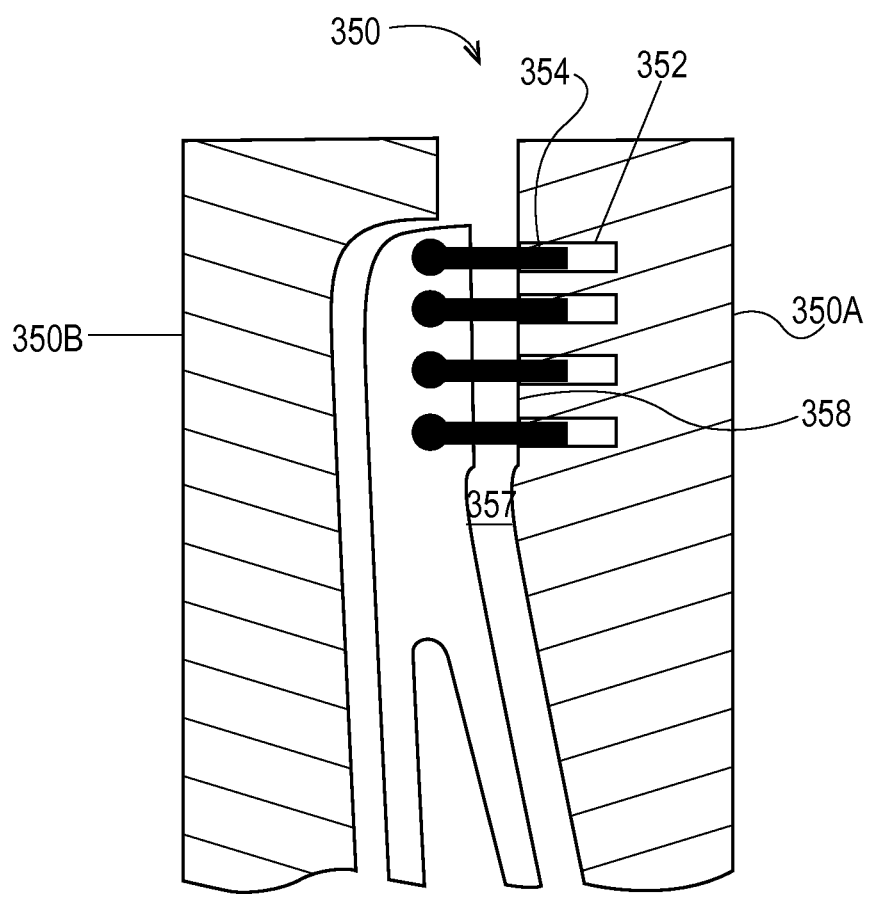
FIG. 16 is a sectional view of mold half separation according to an embodiment of the present invention.

In certain embodiments tufts can be introduced during the molding process. As shown in FIG. 16 a mold 350 may comprise a back mold half 350B and a front mold half 350A having one or more tuft holes 352 containing tufts 354. The end of tufts 354 extend (or made to extend) from the mold cavity surface 356 of the front mold half 350A, in certain embodiments from about 1 mm to about 5 mm or from about 2 mm to about 4 mm. The parison at the toothbrush head portion 358 area is compression molded into the toothbrush head portion 358 of the mold cavity 357 and flows around the tuft ends. The tuft end may be fused if the tuft material, such as, Nylon, are not compatible to the toothbrush material such as polypropylene. The tuft ends at the bottom of the tufts will be locked in the brushhead mechanically. If the tufts are made of a material, such as molded TPE tufts, compatible of the toothbrush material, such as polypropylene, then the tufts do not need to be fused. The toothbrush material and tufts material will form a chemical bond that will fuse the tufts during the molding process.

The materials from which a toothbrush can be made include polypropylenes (PP); nylons (polyamides) (PA); polyethylene terapthalates, including polyethylene terpthalate glycols (PET & PET-G); low-density and high-density polyethylenes (LDPE & HDPE); polyesters (PE); polyvinylchlorides (PVC); and engineering plastics such as Acrylonitrile Butadiene Styrene (ABS), polyphenylene ether (PPE), polyphenylene oxide (PPO). Any sub-types of these materials or other thermoplastics, including blow-molding-grade thermoplastics, with melt flow index between 1 and 4 g/10 min or 1 to 3 g/10 min or 1.5~2.5 g/10 min can be used in the blow molding process to make a unitary toothbrushes.

In certain embodiments of extrusion blow molding, one or more materials can be used to produce a toothbrush, for example a hard plastic material, such as polypropylene, PET, PET-G, LDPE, HDPE. In certain embodiments two or more materials can be used to produce a toothbrush handle, for example a hard plastic material as listed above and one or more thermoplastic elastomers (TPE) chemically compatible with the first material. Examples of TPEs include Sytrenics (S-TPE), Copolyesters (COPE), Polyurethanes (TPU), Polyamides (PEBA), Polyolefin blends (TPO) and Polyolefin alloys (TPV). For example a Polyolefin-based TPE such as TPO would be used with a polyolefin based hard plastic such as Polypropylene, and both are introduced into the extrusion parison to form a toothbrush handle comprising portions made of different materials integrally connected to each other. For example, in toothbrushes the surface portions that are contacted by the thumb or the finger tips can be made of soft plastic, whereas the remaining portions of the toothbrush handle can be made of hard plastic to give the toothbrush sufficient rigidity. The extruded parison made of different materials is then blow molded in the cavity to create the final shape, wherein portions of different material may be deformed.

In certain embodiments of the present invention, a toothbrush may be made from multiple layers of material to create different tactile surfaces in a single step in a single molding cavity.

Generally, in a multi-layer embodiment, an inner, or substrate, layer is made from a first material which is the main load-bearing material and is typically thicker than subsequent outer layers; and an outer layer may be made from a softer material which may have a higher coefficient of friction with skin, or other improved tactile features. Layers may be made in one of three ways: (1) They may be prepared upstream of an extruding orifice in the case of extrusion blow molding or extrusion welding, in which case the layers are melted and brought together and co-extruded integrally with one another, which is known as multi-layer extrusion blow molding, or (2) they may be prepared separately through discrete extrusion processes and brought together only during the molding stage, where a parison of substrate material is extruded and a second material is extruded then cut into a patch or coupon, or is alternately injection molded by itself, and then placed into the mold cavity, which is known to those familiar in the art as in-mold labeling.

In multi-layer extrusion blow molding, multiple materials may be extruded in different manners, for example one manner in concentric layers, the second-varying in the radial direction and the third in an axially-varying manner whereby material or color varies along the extrusion axis. In all three manners, the extruded parison is created by introducing different materials at specific locations and injection pressures upstream of the extrusion annulus. Using this method, toothbrush handles with up to seven layers or multiple stripes can be produced. In the third manner wherein material or color varies along the extrusion axis, the injection port may selectively open and close during the formation of a parison that will form a toothbrush handle.

Figure 17A:
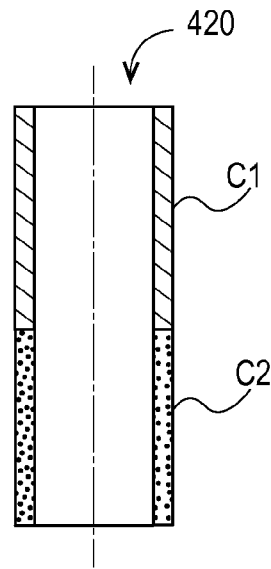
FIG. 17A is a sectional view of an extruded parison produced during an extrusion blow molding process according to an embodiment of the present invention.
Figure 17B:
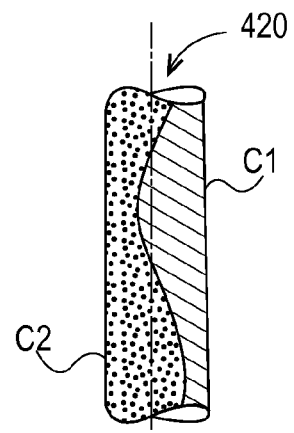
FIG. 17B is a perspective view of an extruded parison produced during an extrusion blow molding process according to an embodiment of the present invention.
Figure 17:
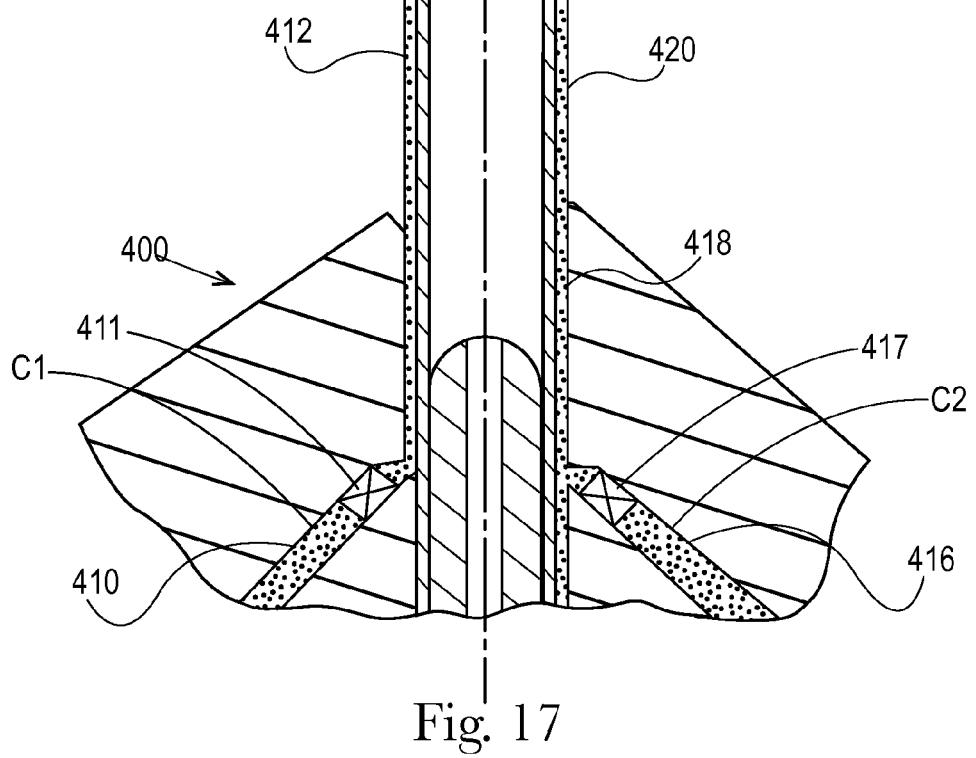
FIG. 17 is a sectional view of an extrusion blow mold process for producing a personal care article according to an embodiment of the invention.

In certain embodiments, as shown in FIG. 17, which shows a detailed section of an extruder 400, comprising a die 402 and mandrel 404, with a core tubular shaped parison 420, to produce a parison 420 having more than one layer. The extruder 400 includes at least one other material injection mechanism 410, which as shown in FIG. 17, can be another extruder nozzle typically placed downstream from the first controlled by a valve 411 to inject a second material 412 providing one or more physical properties to a toothbrush handle, which may be the same or different from any previous or subsequent material. Examples of physical properties include texture, color, coefficient of friction, stiffness, softness, or as illustrated FIG. 17, provided by addition of colorant C1 to the second material 412 or alternatively directly into the parison 420 to color it with colorant C1. In certain embodiments there may be a further material injection mechanism 416 controlled by a valve 417 injecting a third material 418, providing one or more physical properties to a toothbrush handle, which may be the same or different from any previous or subsequent material, as explained previously. In this instance, as with the second material the physical property is color provided by addition of colorant C2 to the third material 418, which is extruded on the outside surface of the parison 420 or alternatively the colorant C2 could be added directly into the parison 420 to color it with colorant C2, for example as shown in FIG. 17A there is a multilayer parison 420 where the colored material 412, 418 is injected to form a layer on the outer surface of the parison 420 in sequential patterns. Colorants C1 and C2 can be injected in a way to create different colors along the parison 420 as it leaves the extruder 400. The extruder can have more than two color mechanisms to create even more variety in colors. FIG. 17A shows an injection of colorant C1, C2 that is coloring the entire parison 420 in sequential patterns. FIG. 17B shows multiple colorants C1, C2 applied around the circumference of the parison 420.

In certain embodiments of the invention, additional layers to the hollow toothbrush handle can be added by the method of In-Mold Labeling (IML). IML is used to place and position labels, such as TPE labels at one or more specific locations on the surface of the toothbrush handle. IML is the inclusion of one or more previously-manufactured flexible but solid components that will form an intrinsic part of the toothbrush handle by attaching and conforming intimately to the outer surface of the blow molded part. Positioning of the IML can be used to enhance the cosmetic appearance, texture, grip, feel, friction coefficient, or softness of the toothbrush handle, for example by using a vacuum to secure labels in position on the inner cavity wall of the mold prior to molding or using vacuum or vent ports to provide both positioning of the label in the part and a texture to the outer tactile surface of the IML portion of the toothbrush handle. The thickness and durometer of the TPE are selected to allow the TPE to deform substantially, and at least partially re-melt at the contact surface with the parison, so that labeling around a compound corner can be achieved with satisfactory cosmetic results.

In certain embodiments of a multi-layer toothbrush made via IML, labels thickness is thin enough to substantially deform during the blow molding step so that labels conform to the three-dimensional shape or contours of the molding cavity and retain that shape after the toothbrush handle is removed from the mold. In certain embodiments labels made from a TPE based material may be under 0.30 mm, 0.25 mm, 0.20 mm or 0.10 mm thick. For example labels made from a polypropylene-based TPE in the Shore A 30-50 range may be under 0.25 mm thick when the polypropylene part wall is 1-3 mm thick to ensure adequate forming to mold cavity contours having radii of curvature less than 0.5/mm In another embodiment of a multi-layer toothbrush made via in-mold labeling, labels have a thickness allowing them to adhere chemically via re-melt to the blown parison during blown molding, but do not deform substantially at the outer surface. In some instances of this embodiment, labels may be pre-textured in an earlier extrusion step via embossing, or in an injection molding step. In this embodiment, labels may be thicker than 0.25 mm, 0.30 mm, or 0.40 mm In a still further embodiment of a multi-layer toothbrush made via IML, the label thickness is thin enough, for example thicker than 0.10 mm, 0.15 mm, or 0.2 mm to substantially deform during the blow molding step so that labels conform to and retain the macro-structure or macro-texture of the mold surface, but not so thin that they retain the micro-structure of the mold surface. In this instance, macro-structure is defined to comprise texture or features on a length scale greater than 0.1 mm such as tactile ribs, bosses, dimples or bumps; and micro-structure is defined to comprise texture or features on a length scale less than 0.01 mm such as grit-blasted textures, matte textures, witness lines or parting lines. In this embodiment, labels should be thicker than 0.10 mm In certain embodiments of the present invention, the TPE labels are die cut. In other embodiments of the invention, the TPE labels are injection molded in a separate first step and are inserted into the blow mold cavity in a separate second step.

Labels may also be pre-decorated or pre-printed prior to installation during molding. The printing can be done on the outside surface of the label, or if the label is transparent or translucent, the printing can be done on the inner surface of the label that will be in contact with the toothbrush handle outer surface. In this embodiment, the printed label's inner surface can be isolated from the user, from chemicals, and water, which provides for improved durability.

In addition to vacuum-assisted In-Mold Labeling (IML), there are a number of methods by which decoration can be added to a toothbrush handle. For example, a shrink sleeve may be wrapped around a toothbrush or portion thereof, for instance a toothbrush handle and shrunk by application of heat, steam, or both to create a form-fitting decorative sleeve which is tightly attached to the handle. This sleeve may have one end wrapped over a shoulder to which a head or head and neck portion is attached. The sleeve may also have the other end tucked under a cap, for which the molded portion of the handle is designed. This may serve to seal one or both open edges of the shrink sleeve and protect from entry of water or other contaminants, or may just assist in decoration, design, and feel in the hand. Either end, neither end, or both ends of the sleeve may be tucked and contained under a separately attached part such as a head or a cap.

In another embodiment, decoration may be printed directly onto the surface of a toothbrush handle following the blow molding operation. The printing of decoration may also be performed on the parison after extrusion but before the blowing operation to take advantage of the single ruled nature of the extruded parison outer surface prior to blowing into a compound surface that would be difficult or impossible to print efficiently.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for extrusion blow molding a unitary toothbrush having an inner cavity comprising:
    a) providing an extrusion blow mold having a longitudinal axis and a cavity, the cavity having a head portion, neck portion and handle portion and a surface that defines a cross-sectional area; wherein the cavity has at least one of a greater cross-sectional area, bordered by two smaller cross-sectional areas along the longitudinal axis of the blow mold or a lesser cross-sectional area bordered by two greater cross-sectional areas along the longitudinal axis of the blow mold;
    b) extruding a parison comprising a thermoplastic resin, the parison includes an interior cavity and an outer surface, wherein the outer surface defines a cross-sectional area of the parison;
    c) closing the blow mold;
    d) expanding the parison using a fluid to contact the cavity surface and subassembly to produce a toothbrush handle having an inner cavity;
    wherein the head portion of the blow mold cavity comprises one or more movable tuft hole pins.

2. The method of claim 1, wherein the tuft hole pins have a diameter of from about 1.5 mm to about 3 mm.

3. The method of claim 1, wherein in the parison thermoplastic resin has a MFI from about 1g/10 min to about 4g/10min at a head temperature of about 180° C. to about 220° C.

4. The method of claim 1, wherein the head portion of the blow mold cavity comprises one or more vents.

5. The method of claim 1, wherein the tuft hole pins extend into the blow mold cavity as the blow mold closes.

6. The method of claim 1, wherein the tuft hole pins extend into the blow mold cavity after the blow mold has closed.

7. The method of claim 1, wherein there are one or more vents positioned between the one or more tuft hole pins and the blow mold.

8. The method of claim 1, wherein the head portion of the blow mold cavity comprises a moveable brushhead base plate.

9. The method of claim 1, wherein the head portion of the blow mold cavity comprises a moveable backplate.

10. The method of claim 1, wherein the head portion of the blow mold cavity comprises one or more tufts extending into the blow mold cavity.

11. A toothbrush produced by the method of claim 1 comprising:
    a) a head, neck, handle, handle end, head end, outer surface, inner cavity, and longitudinal axis;
    b) the inner cavity having a surface defining a cross-sectional area; wherein the inner cavity has at least one of a greater cross-sectional area, bordered by two lesser cross-sectional areas along the longitudinal axis of the toothbrush or a lesser cross sectional area bordered by two greater cross-sectional areas along the longitudinal axis of the toothbrush;
    c) the outer surface defining an outer surface cross-sectional area;
    d) a wall formed from the outer cavity surface and inner cavity surface;
    wherein the toothbrush comprises a single unitary component.

12. The toothbrush of claim 11, wherein the square root of outer surface cross-sectional area varies proportionally to the square root of the inner cavity cross-sectional area along the longitudinal axis of the toothbrush.

13. The toothbrush handle of claim 11, wherein the thickness of the toothbrush handle wall varies in inverse proportion to the square root of the outer surface cross-sectional area.

14. The toothbrush of claim 11, wherein the wall thickness along the circumferential direction at any cross-section normal to the longitudinal axis in 80% of the hollow portion is within 70% to 170% of the mean thickness.

15. A method for extrusion blow molding a unitary toothbrush having an inner cavity comprising:
    a) providing an extrusion blow mold having a longitudinal axis and a cavity, the cavity having a head portion, neck portion and handle portion and a surface that defines a cross-sectional area; wherein the cavity has at least one of a greater cross-sectional area, bordered by two smaller cross-sectional areas along the longitudinal axis of the blow mold or a lesser cross-sectional area bordered by two greater cross-sectional areas along the longitudinal axis of the blow mold;

b) extruding a parison comprising a thermoplastic resin, the parison includes an interior cavity and an outer surface, wherein the outer surface defines a cross-sectional area of the parison;

c) closing the blow mold;

d) expanding the parison using a fluid to contact the cavity surface and subassembly to produce a toothbrush handle having an inner cavity;

wherein the head portion of the blow mold cavity comprises one or more tuft hole pins having about a 1 degree to about 4 degree draft.

16. The method of claim 15, wherein the tuft hole pins have a diameter of from about 1.5mm to about 3mm.

17. The method of claim 15, wherein in the parison thermoplastic resin has a MFI from about 1g/10min to about 4g/10min at a head temperature of about 180° C. to about 220° C.

18. The method of claim 15, wherein the head portion of the blow mold cavity comprises one or more vents.

19. The method of claim 15, wherein the head portion of the blow mold cavity comprises one or more tufts extending into the blow mold cavity.

20. A toothbrush produced by the method of claim 15 comprising:

a) a head, neck, handle, handle end, head end, outer surface, inner cavity, and longitudinal axis;

b) the inner cavity having a surface defining a cross-sectional area; wherein the inner cavity has at least one of a greater cross-sectional area, bordered by two lesser cross-sectional areas along the longitudinal axis of the toothbrush or a lesser cross sectional area bordered by two greater cross-sectional areas along the longitudinal axis of the toothbrush;

c) the outer surface defining an outer surface cross-sectional area;

d) a wall formed from the outer cavity surface and inner cavity surface;

wherein the toothbrush comprises a single unitary component.

* * * * *